(No Model.) 2 Sheets—Sheet 1.

A. SAUNDERS.
SCREW CUTTING DIE.

No. 406,857. Patented July 9, 1889.

Witnesses
Ira R. Steward
Charles A. Herbert.

Inventor
Alexander Saunders
By James A. Whitney
Attorney (No Model.) 2 Sheets—Sheet 2.

A. SAUNDERS.
SCREW CUTTING DIE.

No. 406,857. Patented July 9, 1889.

WITNESSES:
Ira R. Steward.
Charles A. Herbert.

INVENTOR
Alexander Saunders
BY
James A. Whitney
ATTORNEY

UNITED STATES PATENT OFFICE.

ALEXANDER SAUNDERS, OF YONKERS, NEW YORK, ASSIGNOR TO D. SAUNDERS' SONS, OF SAME PLACE.

SCREW-CUTTING DIE.

SPECIFICATION forming part of Letters Patent No. 406,857, dated July 9, 1889.

Application filed April 11, 1889. Serial No. 306,780. (No model.)

*To all whom it may concern:*

Be it known that I, ALEXANDER SAUNDERS, of Yonkers, in the county of Westchester and State of New York, have invented certain new and useful Improvements in Screw-Cutting Dies; and I do hereby declare that the following is a full, clear, and exact description of the invention, which will enable others skilled in the art to which it appertains to make and use the same.

This invention relates to that class of dies for cutting screw-threads which are known as "expanding" screw-cutting dies, and which are used principally for forming screw-threads upon pipes, &c.

The object of this invention is to provide a strong, simple, convenient, and effective means for actuating the screw-cutting jaws; also, for regulating and adjusting the movement of the jaws within defined limits, as occasion may require; also, for permitting the removal and replacement, when desired, of the jaws without taking off the cap-plate of the die.

The invention comprises certain novel combinations of parts, whereby the aforesaid objects are effectually secured, and whereby a screw-cutting die of very great strength, effectiveness, and facility for use is secured.

Figure 1:
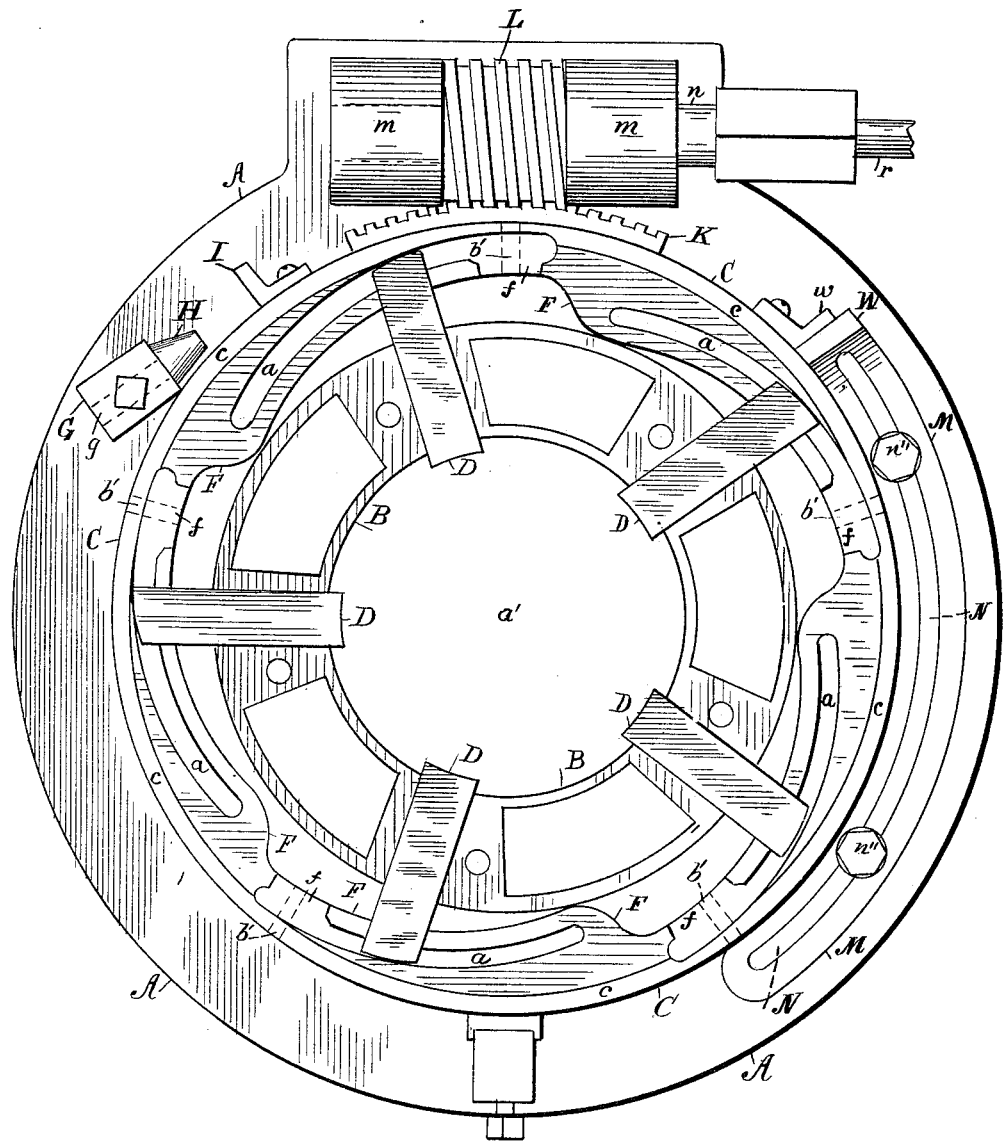
Figure 2:
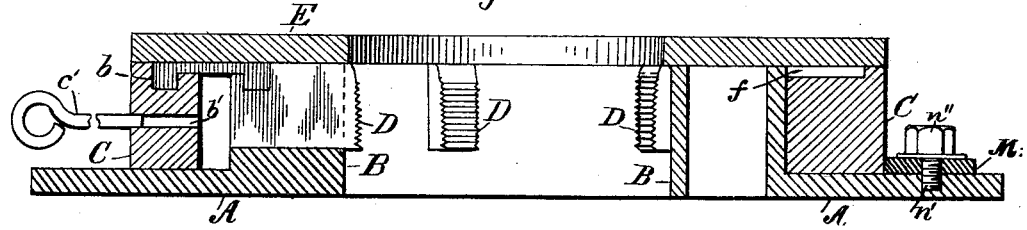
Figure 6:
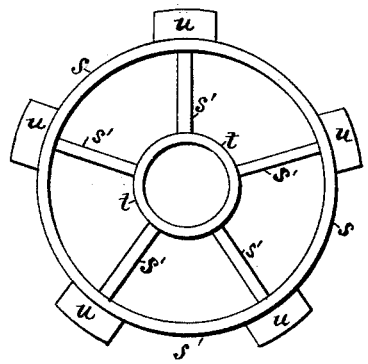
Figure 3:
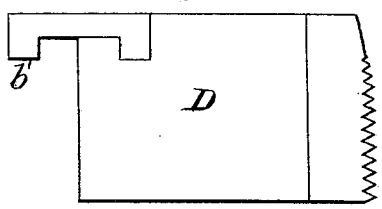
Figure 4:
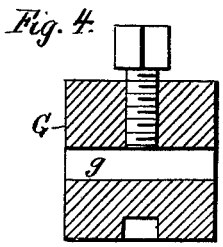
Figure 5:
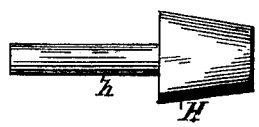
Figure 7:
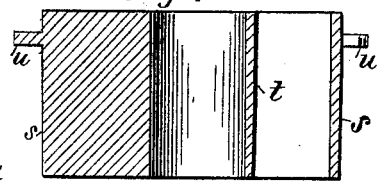

Figure 1 is a face view of a die constructed according to my said invention, with the cap or face plate thereof removed to show the internal arrangement of the parts. Fig. 2 is a transverse sectional view of the said apparatus, and Figs. 3, 4, and 5 are detail views of certain parts thereof. Fig. 6 is a face view of a gage intended for use in accurately adjusting the jaws of the die for the cutting of screw-threads on pipes of any desired diameter. Fig. 7 is a partial sectional detail view further illustrating the device shown in Fig. 6.

A is the block or back plate of the die, and is provided with the circular hub B. Placed around this circular hub B is the movable shell C, this shell being internally provided with shoulders having the eccentric grooves $a$, into which fit the studs $b$, provided to the screw-cutting jaws D, as indicated in the detail view, Fig. 3. These screw-cutting jaws D work through suitable radial grooves in the hub B, the outer surface of the hub B and cutting-jaws D being flush with the surface $c$ of the shell C, so that the face-plate E, (shown in Fig. 2,) being screwed upon the front of the die, holds the jaws D from falling out. As far as concerns the back plate A, with its hub B, the shell C, with its grooves $a$, and the jaws D, the construction may be of any usual or suitable kind. The described relation of the said parts and the construction, as far as hereinbefore indicated, being well known in the art, need not be here further particularized. It is of course to be understood that by turning the shell C in one direction in the usual manner the jaws D are forced inward toward the axis $a'$ of the die, and by turning said shell in the opposite direction the movement of said jaws is reversed, this being the usual operation of an expanding screw-cutting die of the class to which my invention relates.

The inner side of each of the shoulders F, in which the grooves $a$ are formed, as hereinbefore explained, is cut away at that end which is most remote from the axis $a'$ of the die, as shown at $f$. When the shell C is so turned that the openings $f$ are brought coincident with the studs $b$ of the jaws D, the latter may be drawn inward out of their grooves or sockets and thus removed through the central opening of the die. In order that this may not accidentally occur when not desired, there is provided upon the back plate A a fixed standard G, in which is made a horizontal hole or slot. (Indicated in the dotted outline at $g$, and also represented in the detail sectional view, Fig. 4.) Into this slot $g$ is inserted the shank $h$ of a movable stop H, which is shown in detail in said Fig. 5, and which is represented as applied to the standard G in Fig. 1.

Provided upon the periphery of the shell C is a stud or stop I. The parts are so proportioned and arranged that when the stop H is applied in position on the standard G the stud I will strike the end of said stop H before the openings $f$ are brought coincident with the jaws D, thereby preventing the withdrawal of the jaws so long as the stop H remains in place.

When it is desired to withdraw or replace the jaws D, the stop H is removed, whereupon the shell C may be turned farther along, so as to bring the opening $f$ coincident with the jaws D, whereupon, as hereinbefore explained, the said jaws may be withdrawn without removing the cap-plate E. To facilitate this removal, there is provided behind each of the openings $f$ and coincident therewith and in the outer wall of the shell C an opening $b'$. (Shown in dotted outline in Fig. 1, and also represented in Fig. 2.) In removing the jaws D a stem or rod $c'$ is forced through the opening $b'$, and, striking the rear end of adjacent jaw D, drives the same inward, so that it may be readily seized by the fingers of the operator through the central opening of the die.

Provided upon the periphery of the shell C is a rack or toothed sector K, which gears with a worm L, the bearings of which are shown at $m$, and the shaft $n$ of which is squared at the end to receive the end of a suitable wrench $r$ (which latter may of course be removed, except when in use) for turning the worm L. By turning said worm L in one direction or the other the shell C may be turned in one direction or the other to move inward or outward, as the case may be, the jaws D.

The apparatus being designed to cut screw-threads upon pipes, &c., of different diameters, it is desirable, in order to facilitate work, that the jaws D should be set at such a distance from the axis $a'$ of the apparatus that there shall be as little as possible of lost motion in the said jaws in bringing them to their work upon the surface to be cut or threaded. In order to conveniently provide for this, I provide a circular gage, (represented in Fig. 6,) which may comprise a rim $s$, connected by spokes $s'$ with a central ring $t$, and having upon its outer circumference radial projections $u$. The diameter of the rim $s$ corresponds to the diameter of the pipe or other cylindrical article to be threaded, less the depth of the threads. The gage is inserted through the central opening of the die and between the inwardly-projecting ends of the jaws D, and the worm L is turned to bring the free ends of the jaws lightly in contact with the circumference of the rim $s$, the gage being meanwhile prevented from passing through the central opening of the die by means of the studs $u$, which rest upon the outer surface of the inwardly-projecting portions of the jaws D.

In order that the jaws may not recede from the requisite position during the operation of screw-cutting, there is provided upon the back plate A an adjustable slide M, which is longitudinally slotted, as shown at N. Passing through this slot into the nuts or threaded sockets provided in the back plate A are bolts or set-screws $n'$, the heads $n''$ of which lap over the adjacent edges of the slots N. These heads $n''$ are shaped to receive a suitable wrench. By loosening the set-screws $n'$ the slide M may be longitudinally adjusted in the desired degree and then firmly secured in place by tightening the set-screws.

Upon that end of the slide M adjacent to the sector K is a shoulder W. Attached to the circumference of the shell C is a similar shoulder $w$. The shell C having been turned to the position which brings the jaws D against the circumference of the gage, as hereinbefore explained, the slide M is brought with its shoulder W against the shoulder $w$ on the shell C, which done, the slide M is fixed in position by tightening the set-screws $n'$. The shell C is thereby prevented from turning backward in a manner which, if permitted, would allow for an outward movement of the jaws D. The parts being adjusted as described, the gage is removed and the jaws, with the usual screw-cutting teeth, are at the requisite distance from the axis of the die to insure the cutting of the thread upon the pipe or other cylindrical article to the requisite depth, when the said pipe or article is fed into the die in the usual manner. By having gages of different diameters the jaws may be adjusted for cutting screw-threads to the requisite depth upon pipes or other cylindrical articles of various diameters.

What I claim as my invention is—

1. The combination of the removable stop H with the back plate A, having the hub B and carrying radial jaws D, and the stop I on the shell C, which has the grooves $a$, and the recesses $f$ contiguous therewith, substantially as and for the purpose herein set forth.

2. The combination of the removable stop H with the back plate A, having the hub B and carrying radial jaws D, and the stop I on the shell C, which has the grooves $a$, the recesses $f$ contiguous therewith, and the holes or openings $b'$ behind said recesses $f$, substantially as and for the purpose herein set forth.

3. The combination of the worm L, provided upon the back plate A, which has the hub B and carries the jaws D, with a curved rack or toothed sector K on the circumference of the shell C, which has the eccentric grooves $a$ arranged to actuate the said jaws, substantially as and for the purpose herein set forth.

4. The combination of the slide M, placed upon the back plate A, which has the hub B and the jaws D, with the stop $w$ on the circumference of the shell C, which has the grooves $a$, which actuate the said jaws, substantially as and for the purpose herein set forth.

5. The removable stop H, worm L, an adjustable slide M, placed upon the back plate A, which has the hub B and carries the jaws D, with the stop I, the curved rack or toothed sector K and stops c upon the periphery of the shell C, which has the eccentric grooves a, which actuate the aforesaid jaws, substantially as and for the purpose herein set forth.

ALEXANDER SAUNDERS.

Witnesses:
   CHARLES A. HERBERT,
   HOWARD CAMPBELL.